E. C. ANDREWS.
GATE.
APPLICATION FILED MAR. 27, 1914.

1,130,874.

Patented Mar. 9, 1915.

WITNESSES:—

INVENTOR.

UNITED STATES PATENT OFFICE.

EDWIN C. ANDREWS, OF ADRIAN, MICHIGAN.

GATE.

1,130,874.

Specification of Letters Patent. Patented Mar. 9, 1915.

Application filed March 27, 1914. Serial No. 827,520.

*To all whom it may concern:*

Be it known that I, EDWIN C. ANDREWS, a citizen of the United States, and a resident of Adrian, in the county of Lenawee and State of Michigan, have invented a certain new and useful Gate; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to gates.

It particularly relates to a means for lifting one end of the gate to permit small stock such as pigs and sheep to pass beneath the gate while at the same time the gate will prevent the escape of larger stock. Also, in case there is snow on the ground, the gate may be raised so that it will not be blocked by the snow; also the gate may be readjusted in case there is any settling of the gate or of the supporting post to which it is hinged. It also provides a means for preventing stock, such as pigs, from lifting the gate to enable them to pass from the fenced inclosure.

By my invention, a simple, efficient gate is produced and one wherein its parts may be easily constructed and easily assembled and, when assembled and the gate is mounted, it may be easily manipulated.

In my invention a gate is provided having a jointed frame and a diagonal bar which is adapted to reduce the distance between the parallel parts of the frame of the gate and also they may be locked in their relative adjusted positions to prevent alteration of the distance between the parallel parts of the gate. In the preferred form of my invention, a convenient means is provided for altering the angular position of the diagonal bar relative to the top and bottom rails or parts of the frame of the gate and which will lock the diagonal bar relative to the said parts to prevent movement in any direction relative to the said parts when the diagonal bar has been placed in the desired position.

The invention may be contained in many constructions all of which come within the purview of my claims hereinafter appended. To show the practicability of constructions embodying my invention, I have selected one of such constructions as an example and shall describe it hereinafter. The construction selected is illustrated in the accompanying drawing.

Figure 1:
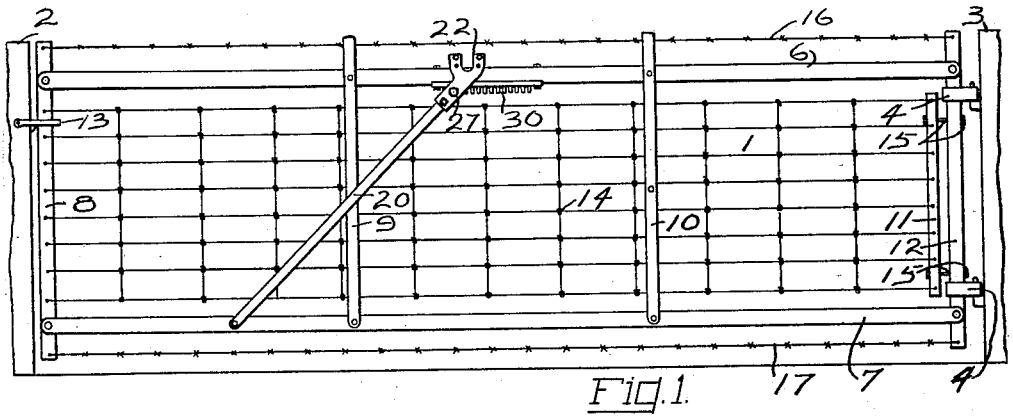
Figure 2:
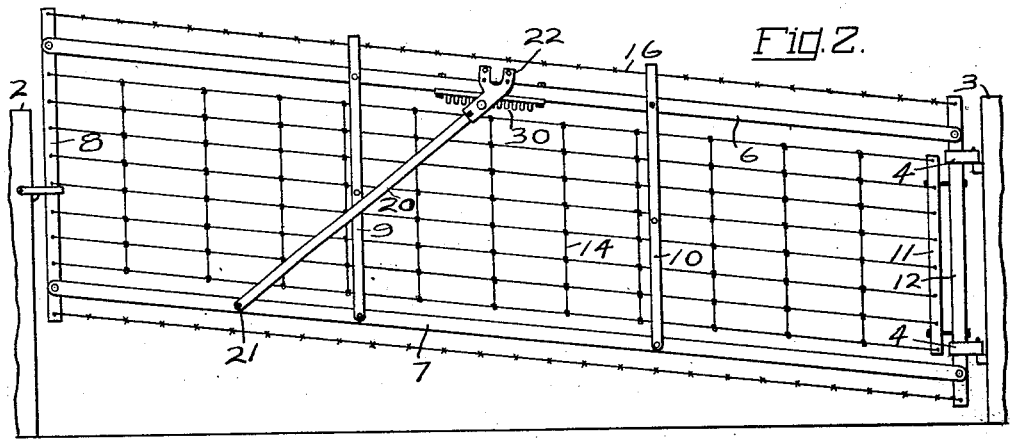
Figures 3, 4, 5:
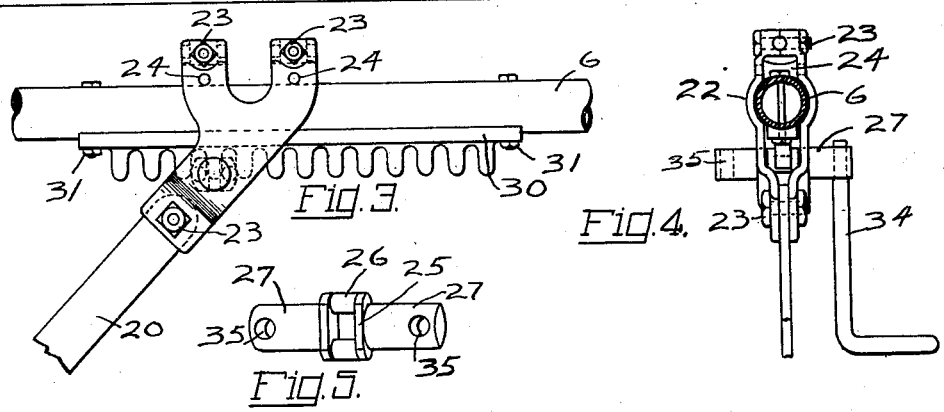

Figure 1 of the drawing, illustrates the gate when placed in its normal position. Fig. 2 illustrates a gate when the end, remote from the hinges, has been raised by the adjustment of the diagonal bar relative to the frame of the gate. Fig. 3 is a sectional view of the rack and locking pinion used for adjustment of the height of the gate. Fig. 4 is an end view of the structure shown in Fig. 3. Fig. 5 illustrates a perspective view of the locking pinion.

1, Fig. 1, is the gate.

2 and 3 are the fence posts between which the gate is located. The gate is hinged to the post 3 by the hinges 4.

The gate is made up of the frame having the upper and lower parallel bars 6 and 7 and the vertical parts 8, 9, 10, 11 and 12. The hinges 4 are secured to the vertical end channel bar 12, while the gate is latched relative to the post 2 by the latch 13 which coöperates with the part 8 in any suitable manner for locking the gate. The parts 8, 9, 10 and 12, are pivotally connected at their ends to the upper and lower bars 6 and 7 which permit angular movements of the parts of the frame of the gate relative to each other and yet maintain the parallelism between opposite sides or parts of the gate frame. A wire fabric 14 extends the length of the gate. It is secured to the end part 8 and to the vertical part 11. The fabric is stretched by means of the nuts and bolts 15 located in the parts 11 and 12 which draw the fabric the length of the gate. The top and bottom of the gate may also be provided with a barb wire 16 and 17 if desired. The parts 9 and 10 may be made of channel iron which is bolted to the top and bottom bars of the gate. The top and bottom bars may be made of pipe of suitable size. The other parts of the frame may be made of channel iron which gives strength and durability to the gate.

A diagonal bar 20 is pivotally connected to the bottom bar 7 of the gate by means of the pivot pin 21. The upper end of the diagonal bar 20 is connected to a frame or housing 22 made of two parts yoked about the top bar 6. The parts are locked together by means of the bolts 23. The frame is provided with rollers 24 which have their bearings in the frame 22. They give freer movement and form a rolling support for the frame or housing along the bar 6. A pinion 25, located below the top bar 6, has bearings on each side in the frame 22. The pinion 25 is provided with two pins 26 located diametrically opposite with respect to the axis of the pinion. A rack 30 is bolted by means of the bolts and nuts 31 to the under side of the top bar 6. The rack 30 is provided with deeply serrated teeth which are so disposed, relative to the pinion, that they extend to the center of the pinion and allow the pins 26 to pass to the bottom of the serrations and also pass over the end of the teeth whereby the two pin pinion may be shifted by the rack when the pinion is rotated. The pinion, moreover, forms a lock preventing any alteration of the diagonal bar 20, relative to the top and bottom parallel bars 6 and 7 except by rotation on the rack. The pinion having but two pins, is capable of being placed on a dead center with respect to the rack so that a horizontal pressure or component brought to bear upon the frame 22, will not produce motion in the frame as the two pins, being located in line with the ends of the teeth of the rack, will be locked. If a third pin is placed in the pinion, such a central relation of the pins of the pinion to the ends of the teeth cannot be obtained, and hence the diagonal bar 20 will not be locked in its adjusted position, as the third pin would cause rotation of the pinion and permit the frame 22 to slip along the top bar 6.

A suitable means, such as the handle 34, may be inserted in holes 35 formed in the hub or shaft 27 of the pinion for conveniently rotating the pinion in the frame 22. When it is desired to raise one end of the gate and lock it in its raised position, the handle 34 may be rotated which will reduce the distance between the parallel parts of the joined frame of the gate and consequently the free end of the gate will be raised in order to bring the parallel parts of the frame nearer together. When the gate has been raised by the pinion 25 and the handle 34 is released, the pinion 25 will be rotated in the reverse direction about a quarter of a turn until the pins 26 are located on opposite sides of one of the engaging teeth of the rack 30, that is, until the pins 26 of the pinion 25 are centrally located with respect to a line passing through the centers of curvature of the ends of the teeth. This will place the ends of the pins 26 in a dead center with respect to possible horizontal movement of the frame 22 along the bar 6.

The construction selected and described may be greatly varied in the arrangement and construction of its parts and in the substitution of the elements having equivalent functions and such modifications may still contain the invention which is described in the claims in the language of the elements shown.

What I claim as new and desire to secure by Letters Patent, is,—

1. The combination of a gate having a jointed frame, a diagonal bar pivoted to one of the parts of the frame of the gate, a rack secured to another part of the frame of the gate, and a pinion having only two diametrically disposed pins coacting with said rack for shifting the end of the bar along the rack and locking the bar with respect to the rack.

2. The combination of a gate having a jointed frame, a diagonal bar pivoted to the lower horizontal part of the frame, a rack located on the upper horizontal part of the frame, the upper end of the diagonal bar having a housing, a pinion located in the housing and having two diametrically disposed pins rotatably movable along the rack, means for rotating the pinion, and rollers mounted in the housing and disposed on the side of the upper part opposite the side to which the rack is attached.

3. The combination of a gate having a jointed frame, a diagonal bar pivoted to one of the parts of the frame, a rack and pinion coacting to shift the other end of the diagonal bar along another part of the frame, the rack having teeth and the pinion having two diametrically disposed pins, the teeth of the rack having a height substantially equal to the distance between the centers of the pins of the pinion.

4. The combination of a gate having a jointed frame, diagonal bar pivoted to one of the parts of the frame and a rack and pinion coacting to shift the other end of the diagonal bar along another part of the frame, the center of the pinion being located within the line passing through the ends of the teeth of the rack.

In testimony whereof, I have hereunto signed my name to this specification in the presence of two subscribing witnesses.

EDWIN C. ANDREWS.

Witnesses:
F. E. AUL,
S. T. KLOTZ.

Copies of this patent may be obtained for five cents each, by addressing the "Commissioner of Patents, Washington, D. C."